United States Patent [19]

O'Connor et al.

[11] Patent Number: 4,792,481

[45] Date of Patent: Dec. 20, 1988

[54] REINFORCED PLASTIC

[75] Inventors: James E. O'Connor; Jon F. Geibel; William H. Beever, all of Bartlesville, Okla.

[73] Assignee: Phillips Petroleum Company, Bartlesville, Okla.

[21] Appl. No.: 936,041

[22] Filed: Nov. 28, 1986

[51] Int. Cl.$^4$ .................. D04H 1/58; B05D 3/02
[52] U.S. Cl. .................. 428/288; 427/177; 427/178; 427/374.1; 427/385.5; 427/389.8; 427/393.5; 427/434.7; 428/290; 428/373; 428/375; 428/378; 428/379; 428/392; 428/394
[58] Field of Search ............... 428/419, 373, 524, 364, 428/377, 378, 288, 290, 375, 379, 392, 394; 524/495, 496; 427/385.5, 389.8, 393.5, 177, 178, 374.1

[56] References Cited

U.S. PATENT DOCUMENTS

| | | | |
|---|---|---|---|
| 2,871,911 | 2/1959 | Goldsworthy et al. | 154/1.7 |
| 3,470,051 | 9/1969 | Meyer | 156/171 |
| 3,895,896 | 7/1975 | White et al. | 425/93 |
| 3,993,726 | 11/1976 | Moyer | 264/174 |
| 4,292,105 | 9/1981 | Taylor | 156/242 |
| 4,296,060 | 10/1981 | Killmeyer | 264/137 |
| 4,423,093 | 12/1983 | Davies | 427/385.5 |
| 4,495,017 | 1/1985 | Abe et al. | 156/181 |
| 4,588,789 | 5/1986 | Scoggins et al. | 525/537 |
| 4,590,104 | 5/1986 | Zeiner et al. | 427/389.9 |

FOREIGN PATENT DOCUMENTS

| | | |
|---|---|---|
| 0102159 | 3/1984 | European Pat. Off. . |
| 0125472 | 11/1984 | European Pat. Off. . |
| 0156131 | 10/1985 | European Pat. Off. . |
| 1620923 | 5/1970 | Fed. Rep. of Germany . |
| 3405523 | 8/1985 | Fed. Rep. of Germany . |
| 3429670 | 2/1986 | Fed. Rep. of Germany . |
| 2168361A | 6/1986 | United Kingdom . |

OTHER PUBLICATIONS

Yeung et al., "Effect of Glass-Resin Interface Strength on Impact Strength of Fiber Reinforced Plastics", Feb. 1978, pp. 62–72, vol. 18, No. 2, Polymer Engineering and Science, (copy enclosed).
Whitney et al., "Double Cantilever Beam Test for Characterizing Mode I Delamination of Composite Materials", Oct. 1982, pp. 297–313, vol. 1, J. Reinforced Plastics and Composites.

Primary Examiner—Thurman K. Page
Attorney, Agent, or Firm—Williams, Phillips and Umphlett

[57] ABSTRACT

A process to form a fiber-reinforced prepreg and shaped objects having a continuous thermoplastic matrix of poly(arylene sulfide ketone) resins is provided. The prepreg is useful to form composites with high temperature resistance. The prepreg is prepared by pultrusion of resin-impregnated fiber reinforcement through a shaped die. The reinforcement can be impregnated from a liquid slurry or resin particles and a wetting agent.

33 Claims, No Drawings

REINFORCED PLASTIC

FIELD OF THE INVENTION

This invention relates to poly(arylene sulfide ketone), PASK. In one of its aspects this invention relates to preparing shaped objects of poly(arylene sulfide ketone). In still another aspect of this invention it relates to shaped objects prepared from poly(arylene sulfide ketone). In still another aspect of the invention it relates to the pultrusion of fiber strands impregnated with poly(arylene sulfide ketone). In still another aspect of the invention it relates to processing steps useful in the pultrusion of fiber strands impregnated with poly(arylene sulfide ketone). In yet another aspect of the invention it relates to molded objects produced using the processes described.

BACKGROUND OF THE INVENTION

The production of shaped objects of poly(arylene sulfide) resin matrix reinforced with continuous fiber strands by the pultrusion process is established. Shaped objects produced by this pultrusion process are useful under conditions that are limited by the softening temperature of the matrix resin. When the resin matrix is a polyphenylene sulfide, the temperature limitation of previously available matrix resins has been partially overcome. However, there are applications such as in reinforced structures or weight-sensitive structures that even higher temperature stability of the matrix resin is desirable. A continuing problem remains in the selection, preparation and use of matrix resins for continuous fiber strand reinforced shaped articles that meet this need.

The substitution of one matrix resin for another in a pultrusion process requires novel processing techniques including adjusting fiber content of pultrusion prepreg, adjusting size of polymer particle for impregnation, adjusting pulling tension, and adjusting die configuration.

Using poly(arylene sulfide ketone) as the resin matrix provides pultruded products that have advantages over the same products made from other materials such as steel, wood, or aluminum. The pultruded products are lightweight, can be designed for the strength and stiffness required, are non-rusting, are corrosion resistant to numerous chemicals and gases, are non-conductive, and have low thermal conductivity. The products have potential use both as parts that become a portion of a larger fabricated structure when the pultrusion is incorporated into the overall fabrication (frames, supports, gratings) and in the type of products which are themselves structures (ladders, walkways, guardrails).

It is therefore an object of this invention to provide a method for preparing shaped objects of reinforced plastic in which poly(arylene sulfide ketone) is the matrix for strands of fiber reinforcement. It is another object of this invention to provide a method for pultruding fiber strands impregnated with poly(arylene sulfide ketone). It is still another object of this invention to provide shaped objects having poly(arylene sulfide ketone) matrix and strands of fiber reinforcement. It is still another object of this invention to provide pultruded objects in which the strands of fiber reinforcement are surrounded with a poly(arylene sulfide ketone) matrix.

SUMMARY OF THE INVENTION

The method in one embodiment comprises impregnating a fiber reinforcement in continuous, optionally unidirectional, form with particles of a poly(arylene sulfide ketone) resin by pulling the reinforcement through slurry of the resin particles, heating the impregnated reinforcement to a temperature sufficient to evaporate the liquid of the slurry and to soften the resin, shaping the heat-softened resin-impregnated reinforcement by pulling this resin-impregnated reinforcement through a heated die to consolidate the resin and fiber reinforcement to form the desired shape and finally cooling the shaped object below the softening point of the resin. Where the PASK comprises poly(phenylene sulfide ketone), PPSK, that has been melt-stabilized as hereinafter described, a process for producing articles of any desired length with use temperature in excess of 300° F. is provided.

In accordance with one embodiment of the present invention, a process is provided for preparing shaped objects in which at least one reinforcement strand of continuous filaments is contacted with sufficient poly(arylene sulfide ketone) having a melt flow rate less than 1000 grams/10 minutes, in the form of powder or in a slurry, to produce a strand impregnated with poly(arylene sulfide ketone) having about 20 to about 75 weight percent poly(arylene sulfide ketone) content and about 80 to about 25 weight percent fiber reinforcement content so that at least one resin impregnated strand is produced. The impregnated strand is then pulled through an elongated die having the characteristics of (1) entrance cross-section being larger than the exit cross-section, (2) the temperature of the entrance region being above the melting point of poly(arylene sulfide ketone), and (3) the temperature in the exit region being sufficient to maintain at least a portion of the poly(arylene sulfide ketone) in the molten state so that a shaped object having at least one resin-impregnated strand is produced. This shaped object, often referred to as a prepreg, which can have the form of a tape, a rod or a sheet, among others is then cooled below the melting temperature of the poly(arylene sulfide ketone) which it contains. The prepreg can be cut, preferably transversely, into pieces.

In another embodiment of the invention, the prepreg can be wound directly onto a preferably heated mandrel, and then cooled. In still another embodiment of the invention, the resin impregnated strand can be wound onto a mandrel skipping a die as described above and further treated at a temperature, time and sufficient compressive force to conform the resin impregnated strand to the shape of the mandrel upon cooling after which the formed article, now comprising a fiber-reinforced continuous thermoplastic matrix is cooled below the melting temperature of poly(arylene sulfide ketone).

In still another embodiment of the invention, the strands of fiber reinforcement are subjected to contact with a stream of gaseous fluid before being contacted with the poly(arylene sulfide ketone) slurry to separate the strand into single filaments and/or bundles of filaments so that the contact between the filaments and the poly(arylene sulfide ketone) slurry is improved. All of the process embodiments of this invention seek to provide a shaped object in which continuous fiber reinforcement is impregnated with poly(arylene sulfide ketone) and surrounded by a poly(arylene sulfide ketone) matrix. The process for producing such product by a pultrusion process is further detailed herein below.

The poly(arylene sulfide ketone) resins, often abbreviated PASK, contemplated in the compositions useful in this invention include those described herein. The presently preferred resin is poly(phenylene sulfide ketone), often abbreviated PPSK.

The term poly(arylene sulfide ketone) includes homopolymers and the normally solid arylene sulfide ketone copolymers, terpolymers, and the like having melting or softening points of at least 300° F. (149° C.) and more preferably from about 400° to about 900° F. (204°–482° C.).

DETAILED DESCRIPTION OF THE INVENTION

In one embodiment of the invention there is utilized a poly(arylene sulfide ketone) resin of high-molecular weight, preferably a resin containing units of the structural formula:

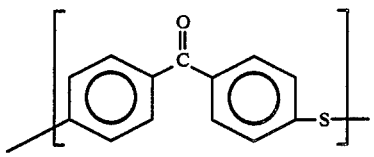

Even more preferred is a highly melt-stable resin which can be formed by treating the resin with an aqueous solution as hereinafter described.

PASK resins can be prepared by reaction of a sulfur source with a halogenated diarylketone in a solvent. Sodium hydrosulfide, sodium sulfide or hydrogen sulfide are good sulfur sources, the most preferred being sodium hydrosulfide, NaHS. The preferred halogenated diarylketones are bis(halophenyl)ketones and even more preferred are compounds that are referred to as bis(4-halophenyl)ketones, the most preferred being bis(4-chlorophenyl)ketone, also known as 4,4'-dichlorobenzophenone. The solvent serves as a reaction medium that at least partly dissolves the reactants and allows the reaction to proceed. The preferred solvent is an organic polar solvent such as an amide. The preferred amide comprises N-methylpyrrolidone.

The resin is recovered in fine particle form from the above reaction generally by filtration, and is preferably contacted with an aqueous solution containing from 1–10 weight percent of a source of an alkaline earth metal. Generally, the source is selected from among the group consisting of a water-soluble halide, nitrate, acetate anf formate of an alkaline earth metal. The preferred source comprises calcium chloride or calcium acetate dissolved in water to give a concentration of from about 4 to about 6 weight percent of this compound. The resin treatment results in a preferred material that is characterized as a melt-stabilized or highly melt-stabilized poly(phenylene sulfide ketone) resin.

High-molecular weight poly(arylene sulfide ketone) resins are characterized as having an inherent viscosity greater than 0.5 dl/g at 30° C. in concentrated sulfuric acid at a resin concentration of 0.5 g/100ml as measured by ASTM D 2857. The preferred PASK resins are characterized as having an inherent viscosity greater than 0.55 dl/g. Even more preferred PASK resins are poly(phenylene sulfide ketone) resins having an inherent viscosity greater than 0.55 dl/g. The high molecular weight PASK resins are usually characterized further as having a measured melt flow rate of less than about 1000 grams/10 minutes, preferably a melt flow rate of less than about 500 grams/10 minutes, and most preferably a measured melt flow rate of less than about 300 grams/10 minutes. Melt flow rate is measured by ASTM D 1238 that is modified by increasing the operating temperature to above the melting point of PASK resins. For the most preferred PPSK resins, the test condition is 371/5.0. Melt flow rate is expressed as grams per 10 minutes, abbreviated "g/10 min."

In the process and composition that is described in this application, the high-molecular weight poly(arylene sulfide ketone) is even further usually characterized as being melt stable or highly-melt stable. Melt stable resins are characterized as maintaining a thermoplastic behavior with high retention of physical properties after at least one melt processing procedure such as melt extrusion or the like. Even more preferred are highly-melt stable resins that can be melt processed in two or more stepwise operations with retention of physical properties such as extrusion pelletizing in a first step, injection molding of the pellets in a second step to form a sheet, and melt compacting of the sheet in a reinforced laminate in a third step. The post-formability of molded articles containing at least one thermoplastic resin over articles containing a thermoset resin is a desirable characteristic to maintain during an at least one melt process multi-step operation.

The melt stability differences between PASK resins can be demonstrated by the observation of the fresh extrudate that is formed during measurement of the melt flow rate by modified ASTM D 1238. The preferred PASK resins form a void-free flexible, continuous, smoothsurfaced cylindrical extrudate having a diameter only slightly in excess of that of the orifice die. In contrast an unstable PASK resin generally forms an extrudate that has many voids, a rough surface, and is inflexible having a diameter several times that of the orifice die. Gas evolution during the heating/cooling cycle of melting extrusion can account for a portion of the observed behavior of the unstable PASK resins.

Melt-stable PASK resins of the preferred characteristics of melt flow rate and inherent viscosity can be characterized further by a detectable calcium concentration. Generally the calcium concentration (expressed on an elemental calcium basis) effective to melt stabilize the resin is in the range from about 50 to about 10,000 parts per million by weight, usually in the range of 100 to about 8,000 ppm, preferably in the range of about 200 to about 6,000 ppm. The calcium can be added to the resin such as by aqueous solution treatment as mentioned below.

When the preferred melt-stable PASK resins are present in a fiber reinforced continuous thermoplastic matrix, the resin matrix is digestible in nitric acid and can be removed from the fiber reinforcement by digestion in nitric acid at 80° C. for 20 minutes. Quantitative recovery of the reinforcement is a means to determine the fiber reinforcement and void content of the shaped object. Prepregs in sheet form that have this digestion characteristic are observed to form multi-layer composites with a high interlaminar fracture toughness, $G_{IC}$.

This behavior contrasts that of prepregs in sheet form prepared from PASK resins having zero melt flow rate. The continuous thermoplastic PASK matrix of such a prepreg is intractable in the hot nitric acid. A multi-layer composite formed from such a prepreg has poor physical properties.

The inadequate behavior of the zero melt flow rate PASK resin can be overcome by mixing said resin with the preferred melt stable PASK resin before the process of this application is practiced (Example 7). The mixing of the two or more resins can be of the ground or powdered PASK resins by any appropriate means such as but not limited to bag blending. Alternately, a quantity of each of the two or more resins can be added to the liquid during the preparation of the slurry for an impregnation bath.

The preferred poly(phenylene sulfide ketone) resins are characterized as having a melting temperature, Tm, in the range of from 300° to 500° C., preferably from 320°–380° C., and a glass transition temperature, Tg, in the range of from 125° to 165° C., preferably from 135° to 150° C. The thermal transitions can be measured with a Perkin-Elmer DAC-2C Differential Scanning Calorimeter equipped with a computerized data system and a Perkin-Elmer TADS-1 plotter at sample heating rate of 20° C./minute. Another physical property of preferred neat PPSK resins after annealing at 240° C. for 4 hours is a heat deflection temperature in the range of from 330° to 400° F., preferably from 330° to 380° F., as measured by ASTM D 648. The heat deflection temperature of one 40 weight percent glass-filled inventive poly(phenylene sulfide ketone) resin composition is greater than 550° F., whereas by comparison one 40 weight percent glass-filled polyphenylene sulfide resin had a heat deflection temperature of about 500° F. This higher heat deflection temperature is a desirable property.

The fiber reinforcement is provided preferably in a continuous form such as a mono-filament, or an assembly of filaments to yield a strand or yarn or roving and for convenience can be provided on a creel as a multiple source. The continuous fiber reinforcement can be characterized as having filaments aligned in a single direction, often being characterized as unidirectional fiber reinforcement. The strands of fiber reinforcement are composed of filaments of glass, carbon, aramid (aromatic polyamide) or metal or mixtures thereof. Also useful are filaments from inorganic materials such as beryllia, magnesia, alumina, silica, zirconia, thoria, boron nitride, boron carbide, silicon carbide and aluminosilicate and mixtures thereof. The preferred fiber reinforcement is composed of glass, carbon, aramid or metal or mixtures thereof. In a further preferred embodiment the fiber reinforcement is glass or carbon.

The aqueous PASK slurry contains sufficient liquid to obtain an efficiently workable loading of the strands of fiber reinforcement to produce a resin-impregnated strand having about 20 to about 75 weight percent PASK content and about 80 to about 25 weight percent fiber content, the total weight of resin and fiber being taken at 100%. When using a particular fiber such as carbon, it has been found preferable that the PASK content of the resin-inpregnated strand be in the range of about 30 to about 50 weight percent of the total composition. In a more preferred embodiment with carbon fibers the PASK content of the resin-impregnated strand is in the range of about 35–45 weight percent of the total composition. These are practical limitations set as the amount of polymer needed to impregnate and to provide a matrix within which the strand is contained and yet not to provide so much polymer that passage of the impregnated strands through the apparatus is impeded sufficiently that breakage of the strands is caused.

It has been found that an average particle size for the PASK resin used for impregnating the strands of fiber reinforcement can be less than one millimeter, preferably less than 0.1 mm, even more preferably less than 0.05 mm, and most preferably less than 0.015 mm (15 microns). The preferred size of particles can be obtained using grinding means for example by air milling. The smallest average particle size resin causes the greatest resin penetration of the fiber reinforcement strands at a given strand tension during the impregnation step and yields a shaped object that is well wet-out. The degree of particle penetration of the fiber reinforcement can be varied by matching of strand tension to spread the strands, and line speed to alter duration of the strand in the slurry to the average particle size. With a given particle size distribution and line speed an increased strand tension reduces the fiber reinforcement content of the product.

Resin particle penetration into the fiber reinforcement strands can be increased by incorporation of a wetting agent into the resin slurry when an aqueous slurry is employed. Effective wetting agents are selected from among the group consisting of polyoxyethylated vegetable oils, ethoxylated alkylphenols, ethoxylated aliphatic alcohols, alkylaryl polyether alcohols and polyoxyalkylene oxide block copolymers including mixtures thereof. Preferred materials are alkylphenoxypoly(ethyleneoxy) ethanols such as octylphenoxypoly(ethyleneoxy)ethanol and polyoxyethylated derivatives of castor oil. Examples of the preferred materials are Triton X-100 (Rohm and Haas Company), a scintillation surfactant identified as S-507 (Fisher Scientific Co.) and a surfactant EL-620 (GAF Corp). The amount of wetting agent present in the slurry can be from about 1 to about 20 weight percent of the amount of PASK resin present, preferably in the range of from 5 to 15 weight percent, and most preferably in the range of 5 to 10 weight percent of the amount of PASK resin present. The presence of the wetting agent should cause no adverse effect on the properties of the shaped objects or laminates prepared therefrom.

Inclusion of excessive liquid in the slurry can result in too little resin on the fiber reinforcement or can cause liquid to be carried into the die which is undesirable. The impregnated strand can be tested for proper content of resin by sampling the resin-impregnated strand at the drying step with the determination of the weight of resin, the weight of fiber reinforcement and the water content, usually nil, of the particular sample. The amount of dilution of the slurry can then be adjusted according to the results of the particular dried sample. The slurry is maintained at the appropriate resin concentration by the introduction therein, periodically, preferably continuously, of an addition slurry comprising resin, wetting agent and slurry liquid.

The resin-impregnated strands of fiber reinforcement can be pulled through a heated die by a gripping/pulling mechanism of the type which is commonly used in a pultrusion process. In another embodiment, the resin-impregnated strands can be wound on a mandrel and consolidated by compression with a heated shoe or roller. When the die is used, the formed shaped object can be cut to any desired length using cutting means known in the art. These cut lengths, particularly of thin sheets or more often referred to as tapes, are known also as prepregs.

The prepreg of this invention is characterized as having the filaments of fiber reinforcement aligned in a single direction generally being parallel one to the other.

The prepregs can be melt welded together to form larger sheets of any dimensions. For example, four prepregs, 10X3 inches, can be welded together along the long edges to form a seamed sheet approximately 10X12 inches. These sheets can be cut to adjust their size for further molding operations such as compression molding to form multi-layer laminates of great structural strength and high use temperature. The individual layers of a laminate can be stacked in a manner to have the fiber reinforcement in adjacent layers aligned in the same direction or alternately at any specified direction to each others, for example at 45° or 90°. Cross layer stacking patterns in the formation of laminates is known in the art.

Alternately, a rotating mandrel, preferably heated, can be used as a pulling device upon which the heated, preformed prepreg is wound, especially when the prepreg is in tape form. Such mandrels are known in the art as shown in U.S. Pat. Nos. 4,010,054 and 4,081,302. The wound prepregs can be shipped and at the shipping destination reheated and unwound for further processing such as shaping. The wound prepregs also can be heated sufficiently, optionally with applied pressure, for permanent bonding to form hollow-shaped, multi-layered laminated articles.

EXAMPLE 1

POLYMER PREPARATION

Typical Two Mole Reaction Procedure

In a two gallon stirred reactor a nominal two mole recipe of reactants was made by charging 2.00 or 2.01 mole (187.8 gm or 188.8 gm sodium hydrosulfide (59.7 weight percent NaSH solution), 2 mole (80 gm.) sodium hydroxide, 2 mole (502.2 gm) 4,4'-dichlorobenzophenone (DCBP), 6 moles (108 ml) deionized water and 24.84 mole (2400 ml) N-methylpyrrolidone. The charged reactor was purged several times with nitrogen while stirring. The mixture was heated to 250° C. and held at that temperature for three hours. The stirring speed was increased and the reactor was heated to 300° C. The heat was turned off and the reactor allowed to cool overnight. The contents of the reactor was filtered to recover a grey solid which was water washed. The solid was placed in a two-gallon stirred reactor, 3,000 ml deionized water and 30 gm sodium hydroxide pellets were added. After purging the closed reactor with nitrogen, the mixture was heated to 120° C., and then cooled, filtered and the recovered solid was water washed. The resulting solid was placed in a two-gallon stirred reactor, 3,000 ml deionized water and 150 gm calcium chloride were added. After purging the closed reactor with nitrogen, the mixture was heated to 185° C. and held at 185° C. for 30 minutes. The mixture was cooled, filtered, and the recovered solid was water washed and then acetone washed. The solid was dried in air in a forced-draft oven at about 100°-110° C. and 330.6 grams solid with a melt flow rate 111 grams/10 minutes was recovered.

Preparation of Feedstock Resin

A feedstock resin in sufficient quantity for the practice of the process described and claimed in this application was prepared from eleven individual PASK resin products that were obtained from the polymerization procedure described above or from PASK resin products obtained by a small modification to the polymerization. This example characterizes the component resin products that were blended to form the feedstock resin, which is also characterized.

The PPSK product obtained from each of six typical polymerization runs as described above was combined with the PPSK resin product from each of five modified polymerization runs. The modified runs were (1) use of 1.976 moles DCBP instead of 2.00 moles, (2) use of 1.988 moles DCBP and omission of the aqueous calcium ion solution treatment, (3) addition of 475 ml. of nitrogen-purged deionized water to the reactor after the temperature reached 300° C. and then passage of air through the internal coils, and (4) in two runs holding the reaction mixture at 200° C. for one hour, followed by dehydration at about 200° C. with removal of 130 and 200 ml liquid overhead, respectively, then addition of 38 and 36 ml. deionized water, respectively, holding the resulting mixture at 250° C. for two hours, and then holding the mixture at 270° C. for 30 minutes before beginning slow cool down overnight. The amount of each of the eleven PPSK resins used in the blend ranged from 293 to 354 grams.

The portion of each of the eleven PPSK resin products that passed through a U.S. standard sieve No. 20 was drum tumbled together for 45 minutes to provide a sufficient quantity of melt-stabilized PPSK feedstock for use in the reinforcement impregnation process. The PPSK resin product of the described typical polymerization process is a low bulk density powder and is densified by pressure molding at room temperature before the melt flow rate is measured. A disk, 1.25 inch diameter, is molded from about 3.0 to 8.0 grams of powdered resin and then is reduced in size by impact or by cutting for loading of the melt flow rate apparatus of ASTM D 1238. The melt flow rate of the individual eleven portions of high molecular weight, melt-stabilized PPSK varied from zero to about 260 grams per 10 minutes. The feedstock has a melt flow rate of 100.4 grams per 10 minutes, and inherent viscosity in concentrated sulfuric acid at 30° C. of 0.56 dl/gram, an ash content of 0.70 weight percent, and an elemental analysis: Carbon - 72.8 weight percent, hydrogen - 3.8 weight percent, sulfur - 15.2 weight percent, oxygen - 9.0 weight percent, chlorine - 0.3 weight percent and nitrogen -0.0 weight percent (none detected). The melt flow rate of the feedstock after being held at 371° C. for 10 and 15 minutes was 17.9 and zero grams per 10 minutes. These data indicate that the PPSK feedstock was of low melt-stability. The feedstock processed smoothly in both the pultrusion and subsequent molding processes.

EXAMPLE 2

Impregnation of Fiber Reinforcement

This example demonstrates the feasibility of impregnating continuous carbon fiber reinforcement with a poly(phenylene sulfide ketone) resin powder suspended in an aqueous slurry and pultruding the impregnated reinforcement through a heated die to form a unidirectionally reinforced article with a continuous thermoplastic matrix.

79.3 grams of the PPSK feedstock of Example 1 were vigorously stirred into 6 gallons of water containing 0.8 grams of wettng agent S-507 (Fisher Scientific Co., Pittsburgh, Pa.). Thirteen strands of continuous carbon filter reinforcement (Hercules AS4-12K, unsized, Lot 662-41 Hercules, Inc., Aerospace Bacchus Works, Magna, Utah) were passed through the aqueous PPSK slurry at an average rate of 18.3 inch/minute. The wet, impregnated continuous carbon strands were pulled through a guide mechanism, a heated drying chamber, and finally through a heated (370° C.) metal die which is described further herein. A laboratory size pultrusion machine (Model P. 500; Pultrex USA, 407 Country Club Dr., San Gabriel, CA 91775) was used to pull the strands through a die having a continuous taper from entrance to exit and a single cavity of stainless steel of 20.3 cm (8.0 inch) length and a constant 7.62 cm×0.15 cm (3.00 inch×0.006 inch) cross-section. In order to provide a constant taper along the length of the die and to reduce the contact area between resin-impregnated fiber strands and metal wall to alleviate fiber breaks, two stainless steel, shims were placed in the die at the entrance to alter the constant cross-section. Each shim was 2.4 mm (0.0494 inches thick).

The two die halves were bolted together by two bolts inserted through bore holes in the solid metal portions of the die halves near the exit. The entrance portions of the die halves were not bolted together so that the die could be opened quickly and easily for cleaning. A strip heater was attached to the bottom die half by clamps, and another strip heater was attached to the top half. The strip heaters were covered with fiberglass insulation material. Three thermocouples were inserted into thermocouple wells: one near the die entrance, one in the middle and one near the die exit.

The final product was a prepreg tape about 0.007 inches thick, about three inches wide, and an areal fiber weight of 160±5 grams per square meter. This continuous prepreg tape was cut to about 10 inch lengths, which were plied and subsequently compression molded to form laminates.

EXAMPLE 3

Preparation of Laminates

In this example unidirectional laminates were formed such that the fiber direction was the same in all plies.

Ten (10) plies of the prepreg tape were laid up in a 10×10 inch picture frame mold. Each ply was made by butt welding together along the length four pieces of the 10-inch cut prepreg and then cutting to yield a square of from 9¾ to 9⅞ inches. The hot press was closed to contact pressure while the mold temperature was raised to 371° C. (700° F.) (about 9 minutes). A pressure of 150 psi was applied for 3 minutes. The picture frame mold was transferred to a press at ambient temperature and cooled to room temperature at 150 psi pressure. Two ten-ply unidirectional laminates with average thickness of 0.093 inch were made by this procedure. The laminates were remolded with a 0.070 inch picture frame mold, which resulted in a reduction of the average thickness to about 0.072 inches, which indicates that the laminate could be consolidated further. The final molded laminates were annealed at 200° C. for two hours. Test specimens were then cut using a water-cooled diamond-blade saw. The average mechanical properties of the unidirectional carbon fiber-reinforced laminates as compared to those of a typical laminate made with a poly(phenylene sulfide) resin (PPS) as the continuous thermoplastic matrix are listed in Table I.

TABLE 1

| Comparison of Laminate Properties | | |
|---|---|---|
| Run Number | 1 | 2 |
| Laminate | PPSK/CF | PPS/CF |
| Longitudinal Tensile Modulus[1], Msi | 15.4 | 16.0 |
| Longitudinal Tensile Strength[1], Ksi | 193 | 197 |

[1]ASTM D 3039

EXAMPLE 4

A 17 ply unidirectional laminate was prepared by the picture frame procedure described in Example 3. After four minutes at contact pressure the temperature of the multi-ply stack was 368° C. (694° F.). A pressure of 150 psi was applied for 3 minutes and the laminate temperature was measured at 373° C. (703° F.). The laminate in the mold was in the cooling press for two minutes at 22° C. (71° F.). The thickness of the laminated article was in the range of from about 0.103 to 0.108 inches. The matrix dominated properties of the laminated article are compared to similar laminates containing PPS in Table II.

TABLE II

| Comparison of Laminate Properties | | |
|---|---|---|
| Run Number | 3 | 4 |
| Laminate | PPSK/CF | PPS/CF |
| Transverse Tensile Modulus[1], MSI | 0.9 | 1.3 |
| Transverse Tensile Strength[1], KSI | 4.9 | 4.8 |
| Transverse Flexural Modulus[2], MSI | 1.1 | 1.1 |
| Transverse Flexural Strength[2], KSI | 9.3 | 8.5 |
| Longitudinal Flexural Modulus[2], MSI | 15.2 | 14.3 |
| Longitudinal Flexural Strength[2], KSI | 129 | 159 |
| Longitudinal Compressive Strength[3], KSI | 84 | 85–100 |
| Transverse Compressive Strength[3], KSI | 12.8 | 18.8 |

[1]ASTM D 3039
[2]ASTM D 790
[3]ASTM D 3410

EXAMPLE 5

In this example a multi-ply unidirectional laminate was prepared as in Example 3 with the compression time increased. A 10 ply unidirectional laminate was prepared with four minutes at contact pressure at 370° C. (698° F.), 30 minutes at 150 psi at 382° C. (720° F.), and 2 minutes at 150 psi at 67° F. in the cooling press. The resulting laminated article was 0.065 inches thick. In Table III the matrix dominated properties of this laminated article, Run 5, are compared to those of the article from Run 3 of Example 4.

TABLE III

| Effect of Molding Time On Properties | | |
|---|---|---|
| Run Number | 3 | 5 |
| Molding Time[1], Minutes | 7 | 33 |
| Plies, Number | 17 | 10 |
| Transverse Tensile Modulus[2], MSI | 0.9 | 1.0 |
| Transverse Tensile Strength[2], KSI | 4.9 | 5.8 |
| Longitudinal Compressive Strength[3], KSI | 84 | 101 |
| Transverse Compressive Strength[3], KSI | 12.8 | 16.8 |

[1]Molding time is sum of time at contact pressure plus time at full pressure in the hot press.
[2]ASTM D 3039
[3]ASTM D 3410

The compressive properties of the laminated article that was molded for the longer time are increased over those molded for a shorter time. This increase can be caused by an increase in modulus of the matrix resin or by an increase in interfacial adhesion between the PPSK resin and the carbon fiber reinforcement.

EXAMPLE 6

In this example positive pressure molding of a 10 ply laminate is demonstrated. The cut PPSK prepreg of Example 2 was assembled as in Example 3 and plied in a 10×10 inch mold in 10 plies with the fiber direction being the same in each layer. The mold was closed to contact pressure until the mold reached 371° C. (700° F.) which required 30 to 45 minutes, and then the pressure was increased to 150 psi and held there for five minutes. The plies were not totally bonded by this treatment. The mold and its contents were returned to the hot press at contact pressure and the temperature was increased to 399° C. (750° F.). In about 90 minutes the interior of the laminate reached 371° C. (700° F.). The pressure was increased to 150 psi and held there for 5 minutes. The mold and its contents were transferred to a second press and allowed to cool to 100° F. under 150 psi pressure. The unidirectional laminated article had a thickness that varied from 0.075 to 0.086 inches. In Table IV the physical properties of the article of Example 6 are compared with those of the Run 3 article of Example 4.

TABLE IV

| Run Number | 3 | 6 |
| --- | --- | --- |
| Mold Type[1] | PF | PP |
| Transverse Tensile Modulus[2], MSI | 0.9 | 0.6 |
| Transverse Tensile Strength[2], KSI | 4.9 | 2.3 |
| Longitudinal Flexural Modulus[2], MSI | 15.2 | 11.7 |
| Longitudinal Flexural Strength[3], KSI | 129 | 142 |
| Transverse Flexural Modulus[3], MSI | 1.1 | 0.8 |
| Transverse Flexural Strength[3], KSI | 9.3 | 8.0 |
| Longitudinal Compressive Strength[4], KSI | 84 | 82 |
| Transverse Compressive Strength[4], KSI | 12.8 | 9.3 |

[1]PF = Picture frame; PP = positive pressure
[2]ASTM D 3039
[4]ASTM D 790
[5]ASTM D 3410

The transverse tensile strength of the picture frame molded article is greater than that of the positive pressure molded article. The difference in cooling rate, e.g. rapid for the picture frame, can cause morphology differences in the final articles that can account for the observed physical property differences.

EXAMPLE 7

In this example a carbon fiber PPSK prepreg was made from a resin blend that was prepared from two resin portions each air-milled to an average particle size less than 10 microns, one portion having an average particle size of 7.2 microns and the other having an average particle size of 3.6 microns. The two resin portions also differed in melt flow rate values, the former resin having a value of zero and the latter being a mixture of the resin feedstock described in Example 1, melt flow rate 100 grams/10 minutes, and a second resin of melt flow rate zero. An aqueous slurry was prepared by adding 600 grams of the air-milled PPSK resin blend to 12 liters of distilled water containing 48 grams of Triton X-100 (Rohm and Haas Co., Philadelphia, Pa. 19105). Thirteen strands of continuous carbon fiber reinforcement (Hercules AS-4,12K) were pulled through the slurry and finally through a heated die (3×0.006 in.) at 375° C. as described in Example 2. The line speed was 24 inch/minute. The cut portions of the prepreg tape that was formed in the above described process were used to prepare a 20 ply unidirectional fiber laminate with a 1.5 inch aluminum strip molded into one edge for measurement of the interlaminar fracture toughness, $G_{IC}$, as described by J. B. Whitney, et al in J. Reinforced Plastics and Composites 1(4) 297–313 (1982). The laminate was prepared in a 10×10×0.1 inch picture frame mold in a process similar to that described in Example 3. Specifically, contact pressure was applied until the plied layers reached a temperature of 366° C., the pressure increased to 150 psi for 3 minutes, and then the mold transferred to the cooling press and held at 150 psi until cool. Additional 20 ply laminates were prepared by the procedure described above using a picture frame mold having three 3×7 inch cavities and one cavity 4×6 inch. Specimens were cut from the laminates for measurement of the physical properties listed in Table V, which compares the properties of the 20 ply PPSK resin matrix laminates with those of a similar laminate containing a PPS resin matrix.

TABLE V

Properties of Carbon Fiber Reinforced PPSK and PPS Laminates

| Run Number | 7 | 8 |
| --- | --- | --- |
| Polymer Type | PPSK | PPS |
| Fiber Content[1], vol. % | 59[a] | 59 |
| Void Content[2], vol. % | 0.2[a] | 0.5 |
| Density[3], g/cc | 1.60[a] | 1.58 |
| Molded Ply Thickness[4], in. (average) | 0.006 | 0.006 |
| Longitudinal Tensile Strength[5], psi × 10³ | 227[b] | 238 |
| Longitudinal Young's Modulus[5], psi × 10⁶ | 17.9[b] | 19.6 |
| Longitudinal Elongation at Break[5], % | 1.1[b] | 1.2 |
| Longitudinal Flexural Strength[6], psi × 10³ | 198[b] | 187 |
| Longitudinal Flexural Modulus[6], psi × 10⁶ | 16.1[b] | 17.6 |
| Short Beam Shear Strength[7], psi × 10³ | 13.0[a] | 10.0 |
| Transverse Tensile Strength[5], psi × 10³ | 3.7[b] | 4.6 |
| Interlaminar Fracture Toughness $(G_{IC})$[8], in-lb/in² | 5.0[a] | 4.0 |

[1]Fiber remaining after digestion in concentrated nitric acid at 80° C. for at least 20 minutes
[2]Modified ASTM 2734 with fiber content measured by acid digestion
[3]ASTM D 792
[4]Micrometer measurement of laminate thickness divided by number of plies.
[5]ASTM D 3039-76
[6]ASTM D 790
[7]ASTM D 2344
[8]Polymer Engineering and Science 18 (2) 62-72 (1978) and J. Reinforced Plastics and Composites 1 (4) 297-313 (1982).
[a]Property measured on test specimen from 10 × 10 inch picture frame 20 ply laminate
[b]Property measured on test specimen from 3 × 7 or 4 × 6 inch picture frame 20 ply laminate.

In general, the properties of these two thermoplastic unidirectional carbon fiber laminates are similar. The one exception is a 30% higher short beam shear strength for the PPSK laminate. This indicates an improved interaction between the PPSK resin and the carbon fiber reinforcement. The interlaminer fracture toughness, $G_{IC}$, is high and indicates a tough laminated article.

That which is claimed is:
1. A process comprising:
   a. providing a supply of high molecular weight poly(arylene sulfide ketone) resin, as characterized below by inherent viscosity, Tg and Tm, in form of particles, said resin having an inherent viscosity greater than 0.55 dl/g, a glass transition temperature, Tg, in the range of from 125° to 165° C., and a melting temperature, Tm, in the range of from 300° to 500° C., a measureable melt flow rate of less than about 1000 g/10 minutes, and a calcium content from about 50 to about 10,000 ppm by weight based on elemental calcium, said particles being suspended in a slurry liquid to form a slurry, b. providing a supply of a reinforcement in continuous form selected from the group consisting of a strand, a roving and a yarn, the fiber of which is stable at the melting temperature of said resin,
c. impregnating the reinforcement with said particles by passing said reinforcement through the slurry to form a resin-impregnated reinforcement,
d. heating the resin-impregnated reinforcement to a temperature sufficient to evaporate the slurry liquid and to soften the resin,
e. subjecting the heated resin-impregnated reinforcement to a compressive force to consolidate the resin and the fiber reinforcement to form a fiber-reinforced continuous thermoplastic matrix, and
f. cooling said matrix to a temperature below the softening temperature of the resin.

2. A process of claim 1 wherein the poly(arylene sulfide ketone) resin comprises a poly(phenylene sulfide ketone) resin.

3. A process of claim 2 wherein the poly(phenylene sulfide ketone) resin is made by reacting 4,4'-dichlorobenzophenone with a sulfur source in a polar solvent to yield a poly(phenylene sulfide ketone) resin and subsequently contacting said poly(phenylene sulfide ketone) resin with an aqueous solution containing from about 1 weight percent to about 10 weight percent of a source of calcium.

4. A process of claim 2 wherein the poly(phenylene sulfide ketone) resin has a melt flow rate of less than about 1000 g/10 min as determined by ASTM D 1238 at 371° C. and an ash content of less than 5 weight percent.

5. A process of claim 1 wherein the slurry is aqueous and contains an effective amount of a wetting agent.

6. A process according to claim 5 wherein the wetting agent is selected from the group consisting of polyoxyethylated vegetable oils, ethoxylated alkylphenols, ethoxylated aliphatic alcohols, alkylaryl polyether alcohols and polyoxyalkylene oxide block copolymers.

7. A process according to claim 6 wherein the wetting agent comprises an octylphenoxypoly(ethyleneoxy)ethanol or a polyoxyethylated castor oil.

8. A process of claim 1 wherein the resin particles have a size of less than 15 microns.

9. The process of claim 1 wherein said fiber-reinforced continuous thermoplastic matrix comprises a prepreg in the form of a tape, rod, sheet or shaped profile, said process further comprising cutting the prepreg and said prepreg is cut into pieces of determined length.

10. The process of claim 1 wherein the concentration of the resin particles in the slurry is maintained to produce a resin-impregnated reinforcement containing from about 20 to about 75 weight percent of the poly(arylene sulfide ketone) resin.

11. The process of claim 10 wherein the slurry is aqueous and contains a wetting agent in a concentration of from about 1 to 20 weight percent of the amount of the resin.

12. The process of claim 1 wherein the reinforcement comprises continuous fibers selected from the group consisting of glass, carbon, aromatic polyamide, metal, beryllia, magnesia, alumina, silica, zirconia, thoria, boron nitride, boron carbide, silicon carbide and aluminosilicate and mixtures thereof.

13. The process of claim 1 wherein the compressive force is applied in an elongated die in which the entrance cross-section is larger than the exit cross-section, with the temperature in the entrance region being above the melting point of said poly(arylene sulfide ketone) resin and the temperature in the exit region being such as to maintain at least a portion of said poly(arylene sulfide ketone) resin in the molten state.

14. The process of claim 1 further comprising winding the resin-impregnated fiber reinforcement on a mandrel, wherein the resin-impregnated fiber reinforcement is subjected to the compressive force after or while being wound on the mandrel.

15. A prepreg comprising a unidirectional fiber reinforcement embedded in a continuous matrix of thermoplastic resin, wherein said resin comprises a high molecular weight poly(arylene sulfide ketone) resin as characterized by having an inherent viscosity greater than 0.55 dl/g, a glass transition temperature, Tg, in the range of from 125° to 165° C., and a melting temperature, Tm, in the range of from 300° to 500° C., a measurable melt flow rate of less than about 1000 g/10 minutes, and a calcium content from about 50 to about 10,000 ppm by weight based on elemental calcium, and wherein said unidirectional fiber reinforcement is selected from the group consisting of a strand, a roving and a yarn.

16. A prepreg of claim 15 wherein the unidirectional fiber reinforcement comprises carbon fibers, said fibers being present in said prepreg in an amount of from about 30 weight percent to about 50 weight percent based on the total weight of the prepreg.

17. A prepreg of claim 16 wherein the high molecular weight poly(arylene sulfide ketone) resin comprises a high molecular weight poly(phenylene sulfide ketone) resin being characterized as melt-stable.

18. A laminated article formed from at least two fiber-reinforced prepregs as in claim 15 comprising at least two layers of fiber reinforcement embedded in a continuous thermoplastic resin matrix.

19. The prepreg of claim 15 wherein a detectable amount of calcium in excess of that detectable from the reinforcement is present.

20. A prepreg of claim 15 wherein the continuous matrix of thermoplastic resin is removable from the unidirectional fiber reinforcement by digestion in nitric acid.

21. A prepreg of claim 17 wherein the high molecular weight poly(phenylene sulfide ketone) resin comprises a melt-stable thermoplastic resin which forms a void-free flexible, continuous, smooth-surfaced cylindrical extrudate during measurement of the melt flow rate according to ASTM D 1238.

22. A prepreg comprising a unidirectional fiber reinforcement embedded in a continuous matrix of a poly(arylene sulfide ketone) resin, which has been treated to improve melt stability, said resin having an inherent viscosity greater than 0.55 dl/g, a glass transition temperature, Tg, in the range of from 125° to 165° C., and a melting temperature, Tm, in the range of from 300° to 500° C., a measurable melt flow rate of less than about 1000 g/10 minutes, and a calcium content from about 50 to about 10,000 ppm by weight based on elemental calcium, wherein, said prepreg is prepared by slurry impregnation of the unidirectional fiber reinforcement with particles of the resin and the resin, before preparation of the slurry of the resin for impregnation of the unidirectional fiber reinforcement, is treated with an aqueous solution containing from about 1 weight percent to about 10 weight percent of a source of an alkaline earth metal for a time and temperature to effect treatment of the resin to improve melt stability.

23. A prepreg of claim 22 wherein the high molecular weight poly(arylene sulfide ketone) resin is a high molecular weight poly(phenylene sulfide ketone) resin.

24. A prepreg of claim 23 wherein the high molecular weight poly(phenylene sulfide ketone) resin forms a void-free flexible, continuous, smooth-surfaced cylindrical extrudate during measurement of the melt flow rate by ASTM D 1238.

25. A prepreg comprising a unidirectional fiber reinforcement embedded in a continuous matrix of a poly(arylene sulfide ketone) resin containing repeating units of the structural formula

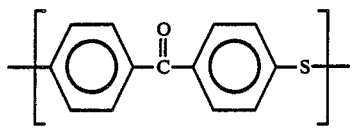

and having an inherent viscosity greater than 0.55 dl/g, a glass transition temperature, Tg, in the range of from 125° to 165° C., and a melting temperature, Tm, in the range of from 300° to 500° C., a measurable melt flow rate of less than about 1000 g/10 minutes, and a calcium content from about 50 to about 10,000 ppm by weight based on elemental calcium, said prepreg having been prepared by a process comprising (a) treating an untreated resin with an aqueous solution containing from about 1 weight percent to about 10 weight percent of a source of an alkaline earth metal for a time and at a temperature to form a treated resin of improved melt-stability, (b) preparing a slurry from the treated resin, and (c) impregnating the unidirectional fiber reinforcement with the treated resin in the slurry.

26. A prepreg comprising a unidirectional fiber reinforcement embedded in a continuous matrix of thermoplastic resin, wherein said resin comprises a high molecular weight poly(arylene sulfide ketone) resin having an inherent viscosity greater than 0.55 dl/g, a glass transition temperature, Tg, in the range of from 125° to 165° C., a melting temperature, Tm, in the range of from 300° to 500° C., a calcium concentration from about 50 to about 10,000 ppm by weight based on elemental calcium, and a measurable melt flow rate of less than about 1000 g/10 minutes measured by ASTM D 1238 at 371° C. with a 5 Kg weight, wherein the continuous matrix of thermoplastic resin is removable from the unidirectional fiber reinforcement by digestion in nitric acid and wherein the prepreg comprises from about 25 weight percent to about 80 weight percent unidirectional fiber reinforcement, based on the total weight of the resin and reinforcement being taken as 100%.

27. A prepreg of claim 26 wherein the high molecular weight poly(arylene sulfide ketone) resin comprises a high molecular weight poly(phenylene sulfide ketone) resin further having a Tg in the range of from 135° to 150° C., a Tm in the range of from 320° to 380° C., a calcium concentration from about 100 to about 8,000 ppm by weight based on elemental calcium, and a measurable melt flow rate of less than about 500 g/10 minutes.

28. A prepreg of claim 27 wherein the calcium concentration is from about 200 to about 6000 ppm by weight based on elemental calcium and the measurable melt flow rate is less than 300 g/10 minutes.

29. A prepreg of claim 28 wherein the unidirectional fiber reinforcement is selected from the group consisting of a strand, a roving and a yarn, comprising carbon fibers, said reinforcement being present in said prepreg in an amount of from about 30 weight percent to about 50 weight percent based on the total weight of the prepreg.

30. A laminated article formed from at least two prepregs of claim 26.

31. A laminated article formed from at least two prepregs of claim 27.

32. A laminated article formed from at least two prepregs of claim 28.

33. A laminated article formed from at least two prepregs of claim 29.

* * * * *